April 4, 1961
R. MERZ
2,977,706
GAS POWERED FISHING ROD
Filed June 30, 1959
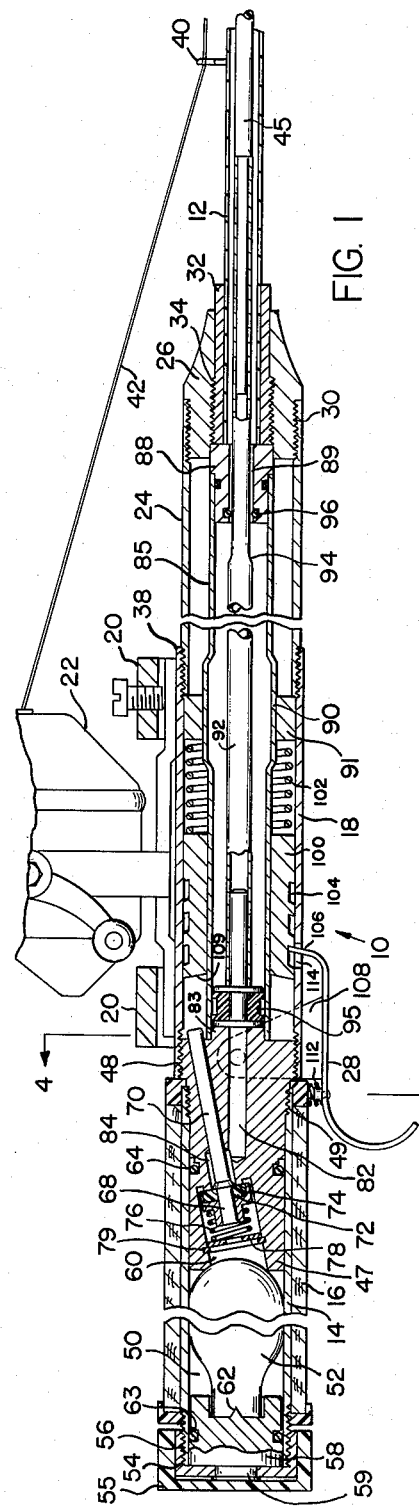
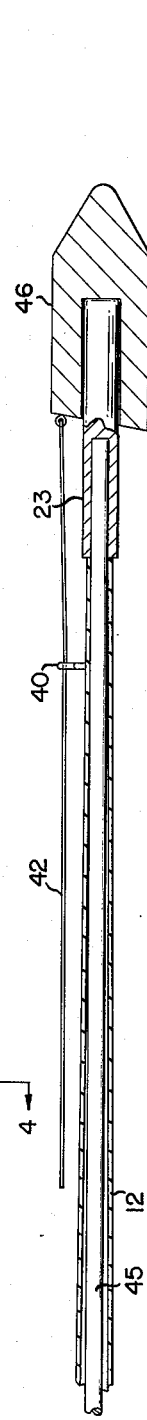
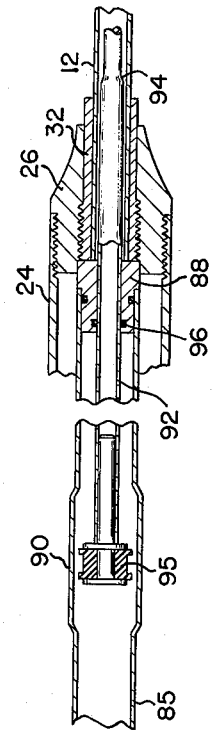
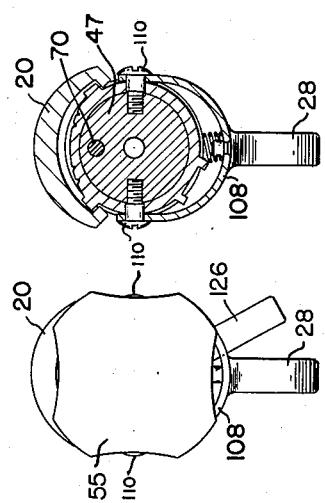
INVENTOR
RUDOLF MERZ
BY
*M. Schlesinger*
Attorney United States Patent Office 2,977,706
Patented Apr. 4, 1961

2,977,706
GAS POWERED FISHING ROD

Rudolf Merz, Rochester, N.Y., assignor to Crosman Arms Company, Inc., Fairport, N.Y., a corporation of New York Filed June 30, 1959, Ser. No. 823,899
7 Claims. (Cl. 43—19)

This invention relates to a fishing rod, and more particularly to a gas powered casting rod for catapulting a fishing lure which is loosely supported on the end of the rod.

Fishing rods, presently known, that use pressurized gas for propelling or catapulting a fishing lure or plug are relatively complicated in their construction, and the forward motion of the rod section during the catapulting action is suddenly stopped when one mechanical portion physically strikes another with considerable force. This not only tends to jerk the fishing rod from the operator's grasp, but also strains certain parts of the rod each time it is used which shortens its useful life.

Moreover, the devices presently known require a separately mounted or attached gas supply for holding the gas that catapults the lure, and it is necessary to handle and operate the rod in a manner different than is customary when manually casting a lure. Thus, the advantages which such present known devices offer are minimized in that the separately connected gas supply is bulky, and restricts the free movement of the fisherman and makes it difficult to play or tire the fish once it has taken the lure.

One of the objects of this invention is to provide an improved casting rod which uses pressurized gas for catapulting a fishing lure or plug.

Another object of this invention is to provide a fishing rod of the character described which has minimum recoil, and the forward movement of the rod during the catapulting action is cushioned towards the end of its travel without physical engagement of opposing parts.

A further object of this invention is to provide an improved casting rod of the character described wherein the released gas which provides the catapulting force also provides a cushion for terminating the forward movement of the rod.

A further object of this invention is to provide an improved casting rod of the character described, which holds its own gas supply in the handle of the rod.

A still further object of this invention is to provide an improved casting rod of the character described which is well balanced and has the feel and handling characteristics of a conventional casting rod.

A still further object of this invention is to provide an improved casting rod of the character described which is durable in its construction, has relatively few moving parts, and is inexpensive to manufacture.

Other objects of this invention will become apparent from the specification, the drawings, and the appended claims.

In the drawings:

Fig. 1 is a fragmentary sectional view of one embodiment of this invention;

Fig. 2 is a fragmentary sectional view of the rod section of the embodiment shown in Fig. 1 showing a plug supported on the forward end thereof;

Fig. 3 is a rear end view of the device;

Fig. 4 is a sectional view taken at line 4—4 of Fig. 1 and looking in the direction of the arrows; and Fig. 5 is a fragmentary sectional view showing one position of the rod-actuating piston in its travel.

This embodiment of the invention comprises an elongated hollow rod section which is attached to a tubular housing. This housing has a clamp for holding a reel, such as a spinning reel. The fishing line is adapted to be threaded through guides secured along the hollow section, and the end of the line is fastened to a plug or lure, which is loosely supported on the end of another elongated rod section which is slidably mounted in the interior of the hollow rod section, and has a piston attached at one end which is reciprocable in a cylinder in the tubular housing. A source of gas is adapted to be contained in the housing, and is controlled by a valve which is opened by the impact of a hammer. The gas acts against the piston to force the slidable rod section, on which the plug is supported, forwardly relative to the hollow rod section to cast the lure. The gas which forces the slidable rod section forward escapes around the piston portion of the rod intermediate the length of its travel and cushions the rod to terminate its forward movement.

Referring to the drawings, the gas powered casting device of the invention is similar in its exterior construction and appearance to a conventional casting rod. It has a tubular housing, generally referred to at 10, and an elongated hollow rod section 12, which may be made of light action flexible glass. The rod section 12 is rigidly attached to, and extends forwardly beyond the end of the housing 10.

The housing 10 comprises a rear handle portion 14, which is covered with material 16, such as cork, a central tubular member 18, which is provided with clamps 20 for supporting a fishing reel, such as 22, and a forward tubular portion 24. A finger grip or trigger member 28 is mounted adjacent the handle portion 14 and positioned diametrally opposite the reel 22 for triggering the mechanism of the device as will be described hereinafter. The trigger member has a curved portion for comfortably holding the handle of the rod when reeling in the plug or playing the fish.

The tubular portion 24 of the housing 10 threadably engages the cylindrical portion 18 at 38, and a valve block 47 threadably engages the tubular portion 18 at 48. The valve block has a portion of reduced diameter which extends rearwardly of the tube 18 which is externally threaded at 49 to receive the tube 14. A connecting plug 26 partially closes and threadably engages the front end of the tube 24 at 30. A tubular bushing 32, which is threadably secured to the plug 26 at 34, surrounds the rear portion of the hollow rod section 12, and is attached thereto by braising, press fitting, or otherwise. The hollow rod section 12 is provided with fishing line guide members 40 which are spaced along the rod section and through which a fishing line, such as 42, is adapted to be threaded. Mounted in the elongated rod section 12 and movable relative thereto is an elongated rod section 45 which may be made of heavy action flexible glass. This rod section 45 extends forwardly beyond the end of the hollow rod section 12 and extends rearwardly into the housing 10 as will be described in detail hereinafter. The line 42 is tied at its front end to a fishing lure or plug 46, which is loosely supported on a member 23 attached to the forward end of the slidable rod section 45.

The tubular handle portion 14 of the housing has a reservoir or chamber 50, which is adapted to contain a conventional, replaceable, carbon dioxide cartridge 52. This cartridge is inserted in the rear end of the tube 14 with the cartridge 52 having its narrow neck portion extending towards the rear. A cap 54 having a rubber cover 55 closes, and is threadably attached to the rear end of the tube 14 at 56. A block 58 is attached to the inner side of the cap 54 by a rivet 59, and has a piercing projection 62 for piercing the end of the cartridge 52 to release gas therefrom. The released gas is prevented from escaping through the rear of the handle portion 14 by an O-ring 63 which is mounted in a peripheral recess in the block 58. An O-ring 64, which is mounted in a peripheral recess of the valve block 47 prevents gas from escaping from the reservoir 50 forwardly between the walls of the tube 14 and the valve block 47.

The valve block 47 has a chamber 60 which is formed at an angle to the axis of the block and communicates with the reservoir 50. A poppet valve 68 is mounted in the chamber 60 and has a gasket portion 72 which is adapted to seat on a plane seating surface 74 formed on the block 47 in the chamber 60. The poppet valve 68 is held normally closed by a coil spring 76 which is interposed between the poppet valve and a washer 78 that is secured in the chamber 60 by a ring 79. The valve has a stem 70 which extends through a bore of the valve block 47 at an angle to the axis of the rod and which is engaged to open the valve in a manner which will be described hereinafter. The block 47 has an axially extending bore 82 which opens on the front face of the valve block and communicates with a chamber 84 surrounding the valve stem 70. An elongated tubular member 85, which is concentrically mounted in the assembly 10, sealingly fits over a reduced portion 83 at the front end of the valve block. The forward end of the tubular member 85 is attached to and is partially closed by a plug 88, which has a bore 89. This plug extends into the tube 85, and has a portion of larger diameter to form a shoulder against which the front end of the tube 85 engages. The plug 88 also engages in the member 26 against the rear surface of the bushing 32.

Intermediate the ends of the tube 85 is an enlarged portion 90, the purpose of which will be described hereinafter. Interposed between the wall of the tube 18 and the peripheral surface of the enlarged portion 90 and bearing against the end of the member 24 is a cylindrical block 91 which supports the tube 85 intermediate its ends.

The elongated rod section 45, which extends through the hollow rod section 12, has an enlarged portion 92, which forms a shoulder 94 at its front, and which extends from this shoulder rearwardly to the end of the rod section. A piston 95 is attached to the rear end of the portion 90 of the rod section 45, and the diameter of this piston 95 is such that the piston slidably engages the walls of the reduced portion of the tube 85, but is smaller than the enlarged portion 90 so as to provide a space between the piston and the tube 85 when the piston is opposite this enlarged portion 90 of the tube or cylinder 85.

The bore 88 of the plug 88 is of a sufficient diameter to provide a slight clearance with reference to the reduced portion of the rod section 45. An O-ring 96 is positioned in the bore 89 so as to sealingly engage the surface of the enlarged portion 92 of the rod section 45 when this enlarged portion enters the bore 89.

A cylindrical annular hammer 100 is interposed between the periphery of the cylinder 85 and the inner wall of the tube 18 rearwardly of the enlarged portion 90. This hammer is constantly urged by a coil spring 102 to slide rearwardly in the tube 18. This spring is interposed between the block 91 and the forward surface of the hammer. The hammer 100 has a rear conical surface 109 which has an element parallel to the front end face of the angularly positioned valve rod 70. A plurality of spaced annular recesses 104, which are formed in the periphery of the hammer 100, are adapted to be releasably engaged by a projection 106 of the grip or trigger member 28. The member 28 has a yoke portion 108 (see Fig. 3) for pivotally mounting the member to the tube 18 by threaded studs 110. A coil spring 112, which is compressed between the member 28 and the surface of the assembly 10, urges the projection 106 selectively into engagement of the recesses 104 through an opening 114 of the tube 18.

A cocking member 126 (see Fig. 3) extends radially from the tube 18 through an elongated slot formed therein at an angle to the member 28. This cocking member is attached to the hammer 100, and is operable to move the hammer 100 forward in the tube 18 against the compression of the spring 102.

The hollow rod section 12 tapers slightly toward its forward end to slidably grip at its forward end, the rod section 45. With the rod 45 in its retracted position, the rear edge of the member 23, which is attached to the forward end of the rod section 45, engages the forward end of the rod 12 and the piston 95 is at the rear of the cylinder 85 abutting the front surface of the portion 83 of the valve block 47.

To load the device, the cap 54 is removed from the tube and a replaceable gas filled cartridge 52 is inserted therein. The cap 54 is then threaded over the end of the tube 14 forcing the piercing projection 62 of the block 58 into the cartridge. The cap 54 is then unthreaded slightly to withdraw the projection 62 from the puncture in the cartridge to release the gas into the reservoir 50 and the chamber 60. The hammer 100 is then pushed forwardly by its handle 126 until the projection 106 engages in a selected one of the recesses 104 in the hammer. As the force of the hammer 100 determines the extent and duration of the opening of the valve 68, the distance that the lure 46 will be cast depends on which of the annular recesses 104 is engaged by the projection 106 when the hammer is cocked.

The device is now ready for casting, and it is pointed in the direction in which the fishing lure is desired to be propelled. The trigger member 28 is then rocked slightly to disengage the projection 106 from the recess 104. Then the spring 102 propels the hammer rearwardly in the tube 18, to strike the valve stem 70 to open the poppet valve 68 momentarily. Gas now escapes from the reservoir 50 and the chamber 60 into the chamber 84 and the bore 82 to force the piston 95 forward in the cylinder 85, which drives the rod section 45 forwardly relative to the rod 12. This propels the plug 46 positioned on the end thereof with great force and velocity. During the forward movement of the rod 45, the enlarged portion 92 enters the bore 89 engaging the sealing ring 96, and the piston 95 enters the enlarged portion 90 in the cylinder 85. The entry of the piston 95 into the enlarged portion 90 of the cylinder 85 permits the gas behind the piston to bypass the piston. When the piston 95 reaches the reduced portion of the cylinder, gas is trapped between the piston 95 and the block 88. The sealing ring 96 prevents the escape of gas through the bore 89. The further forward travel of the piston 95 compresses this gas providing a cushion to assist in stopping the forward movement of the rod 45.

The plug 46 may be conventionally reeled in. If a fish should take the lure, the rod is sufficiently flexible so that the fisherman will get the maximum enjoyment in landing the fish. In the event that no fish should take the lure on the first cast of the plug, the rod section 45 is pushed in the rod section 12 to position the piston 95 rearwardly in the cylinder 85 and the plug is replaced, as previously described. When the rod section 45 is pushed rearwardly in the hollow rod section 12 the enlarged portion 92 leaves the bore 89 permitting the cushioning gas to escape forwardly through the rod section 12.

It should be noted that the offset angular position of the valve stem 102 permits a more compact structure for the housing portion 10 of the rod while still permitting the piston 95 a relatively large surface area against which the gas pressure is effective. This provides a fishing rod which is easy to handle yet has a relatively powerful catapulting action.

It is apparent that the casting device not only effectively catapults a lure the required distance for pleasurable casting, but it is so constructed that the forward motion of the rod during the catapulting action is effectively cushioned for smooth operation.

It is also apparent that any type of plug may be used with this invention and that the manner of supporting the plug on the end of the rod 45 may be varied to suit the individual needs of practice. In the event the operator temporarily should be out of gas cartridges, he may continue to enjoy fishing by merely using the rod and plug in a conventional manner.

While the invention has been described in connection with a specific embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described my invention, what I claim is:

1. A gas-powered fishing lure casting device, comprising a housing open at its forward end and having therein a chamber for the storage of gas under pressure, a rod mounted to slide rectilinearly in said housing and adapted to carry a fishing lure at its forward end, a piston secured to said rod, a valve positioned in said housing and operable to admit gas under pressure from said chamber against said piston to move said rod forward relative to said housing to catapult said lure forward, means in said housing operative during forward movement of said rod for bypassing gas around said piston, and means in said housing cooperative with said piston during further forward movement of said rod in the housing for compressing said bypassed gas to cushion said further forward movement.

2. A gas-powered fishing lure casting device, comprising a housing having a chamber for the storage of gas under pressure, a tube secured in said housing, an elongated rod slidably mounted in said tube and extending exteriorly thereof for carrying a fishing lure, a piston secured to said rod and reciprocable in said tube, a valve positioned in said housing and operable to admit gas under pressure from said chamber against the rear end of said piston to move said rod forwardly in said housing to catapult said lure forward, means including said tube for bypassing said gas around said piston during forward movement of said rod in the housing, and means including said piston for compressing said bypassed gas during further forward movement of said rod in the housing to cushion the further forward movement of said rod.

3. A gas-powered fishing lure casting device, comprising a housing having a chamber for storing gas under pressure, a tubular member mounted in the housing for communication with said chamber, a piston slidably mounted in said tubular member, an elongated rod connected at its rear end to said piston and extending forwardly in said tubular member and outwardly beyond the end of said housing, a valve normally closing off communication between said tubular member and said chamber but operable to admit gas under pressure from said chamber into said tubular member against the rear face of said piston to force said rod forward in said tubular member, and means including said piston and tubular member and operative during the forward movement of said piston to permit said admitted gas to bypass said piston, and means including said piston said tubular member and said rod for compressing said bypassed gas during further forward movement of said piston to cushion the further forward movement of said rod.

4. A gas-powered fishing lure casting device, comprising a tube, a piston reciprocably mounted in said tube, an elongated rod attached at its rear end to said piston, said rod extending outwardly beyond said tube and adapted to carry a fishing lure, said rod having a portion of enlarged diameter adjacent said piston and a portion of smaller diameter forward of said enlarged diameter portion, a plug closing the forward end of said tube, said plug having an opening into which the smaller diametrical portion of said rod loosely fits, means for admitting gas under pressure into said tube against the rear face of said piston to drive said piston and said rod forward relative to said tube to catapult said lure forwardly, and means for bypassing gas around said piston during forward movement of said piston in said tube, said enlarged diametrical portion of said rod, during forward movement of said rod, sealing the opening of said plug to form a sealed chamber in said tube between the front face of said piston and said plug whereby said piston compresses said bypassed gas during further forward movement of said piston in said tube to cushion said farther forward movement.

5. A gas-powered device for casting fishing lures comprising a tube having a portion of enlarged diameter between its front and rear ends, a piston reciprocable axially in said tube and having a working diameter substantially equal to the internal bore diameter of said tube at its front and rear ends, a guide member secured in the forward end of said tube and partially closing the same, said guide member having a hole extending therethrough axially of said tube, a rod secured to the front end of said piston to project forwardly through said hole and beyond the same, said rod being adapted to carry a fishing hook on its forwardly-projecting portion, said rod having a portion of reduced diameter positioned to extent through said hole when said piston is at its rearmost position in said tube, and said rod having a larger diameter portion rearward of said reduced diameter portion and which is of an external diameter substantially equal to the internal diameter of said hole, and means for admitting gas under pressure into said tube against the rear face of said piston to force said piston forwardly in said tube to catapult said hook forward, and whereby the enlarged diameter portion of said tube serves to by-pass gas around said piston when said piston is traveling in said enlarged diameter portion of said tube, and the by-passed gas is trapped between the piston and said guide member, when the larger diameter portion of said rod is traveling through said guide member, to cushion the further forward movement of the piston.

6. A gas-powered device for casting fishing lures comprising a tubular housing, a tube mounted inside said housing in radially-spaced relation thereto, said tube having a portion of enlarged bore diameter between its front and rear ends, a piston reciprocable axially in said tube and having a working diameter substantially equal to the internal bore diameter of said tube at its front and rear ends, a guide member secured in the forward end of said tube and partially closing the same, said guide member having a hole extending therethrough axially of said tube, a rod secured to the front end of said piston to project forwardly through said hole and beyond the same, said rod being adapted to carry a fishing hook on its forwardly-projecting portion, said rod having a portion of reduced diameter positioned to extend through said hole when said piston is at its rearmost position in said tube, and said rod having a larger diameter portion rearward of said reduced diameter portion and which is of an external diameter substantially equal to the internal diameter of said hole, said housing having a chamber rearward of said tube and adapted to hold gas under pressure, a valve block secured in said housing to close the rear end of said tube and to form the front wall of said chamber, said block being provided with a duct connecting said chamber and the rear end of said tube to admit gas into said tube against the rear end of said piston, a valve reciprocable in said valve block, spring means constantly urging said valve to a closed position to shut off communication between said chamber and said tube, a stem connected to said valve and reciprocable in said block in a direction inclined to the axis of said tube and disposed to project forwardly beyond said block when said valve is closed, and means for opening said valve comprising an annular hammer mounted to slide on said tube axially thereof, spring means for constantly urging said hammer rearwardly to cause its rear face to strike said stem and open said valve, and a manually-releasable detent for holding said hammer in inoperative position.

7. A gas-powered device as claimed in claim 6 wherein said hammer has an internally-conical rear striking face whose cone angle is approximately the complement of the angle of inclination of said stem to the axis of said tube.

References Cited in the file of this patent

UNITED STATES PATENTS

| | | |
|---|---|---|
| 2,725,048 | Koogle | Nov. 29, 1955 |
| 2,817,178 | Keck | Dec. 24, 1957 |
| 2,864,197 | Johnson | Dec. 16, 1958 |